Figure 1:
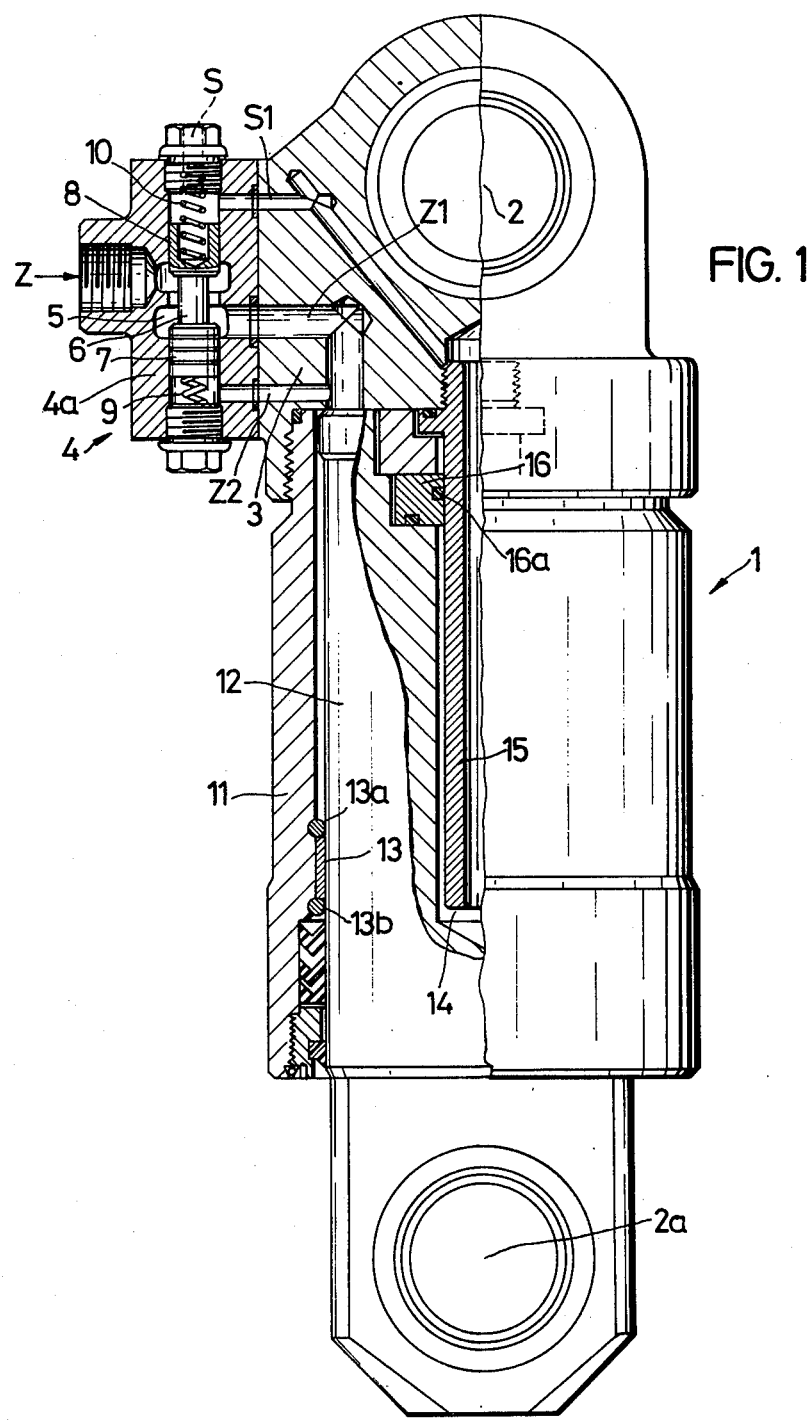

United States Patent [19]

Thiele

[11] 4,037,860
[45] July 26, 1977

[54] SUSPENSION ARRANGEMENT

[76] Inventor: Horst Thiele, Friedhofstrasse 12, Neuenstadt a.K., Germany, 7106

[21] Appl. No.: 612,492

[22] Filed: Sept. 11, 1975

[51] Int. Cl.² .......................................... B60G 11/26
[52] U.S. Cl. ............................... 280/709; 267/65 D; 280/714
[58] Field of Search ................... 280/702, 709, 714; 267/64 R, 64 A, 65 R, 65 D

[56] References Cited

U.S. PATENT DOCUMENTS

| 3,168,302 | 2/1965 | Burris | 267/64 R |
| 3,558,153 | 1/1971 | Strauff | 267/64 A |
| 3,572,679 | 3/1971 | Strauff | 267/64 A |
| 3,598,422 | 8/1971 | Strauff | 280/702 |
| 3,807,717 | 4/1974 | Ito | 267/64 R |
| 3,810,611 | 5/1974 | Ito | 267/64 R |
| 3,873,121 | 3/1975 | Ito | 267/64 A |

FOREIGN PATENT DOCUMENTS 1,069,805  8/1964  United Kingdom ............ 280/124 R

*Primary Examiner*—Philip Goodman
*Assistant Examiner*—John A. Carroll
*Attorney, Agent, or Firm*—Kurt Kelman

[57] ABSTRACT

Each of several single-acting, load distributing, hydraulic cylinders interposed between respective axles and the frame of a truck is provided with a control device having a cylinder element and a plunger element connected to the plunger and cylinder members of the load distributing cylinder for joint movement. The control cylinders are permanently connected to a control line carrying hydraulic fluid, and the several load-distributing cylinders communicate through respective valves with a pressure line normally sealed from the control line. Each valve disconnects the associated, load-distributing cylinder from the pressure line connecting it to other cylinders when the pressure differential between the associated cylinder and the control line exceeds a predetermined value.

5 Claims, 2 Drawing Figures

SUSPENSION ARRANGEMENT

This invention relates to vehicular suspension systems, and particularly to a suspension arrangement in which communicating hydraulic cylinder units are interposed between the vehicle frame and the several vehicle axles to distribute the load evenly among the axles.

A pressure-distributing cylinder or a connecting conduit may burst under sudden stresses, and the resulting collapse of the suspension system may cause the vehicle to topple. It has been customary, for this reason, to install a flow responsive valve in each connecting conduit which shuts the conduit in response to an excessively high velocity of the hydraulic fluid in the conduit, as would normally occur in the event of a rupture. The known valves, however, respond only to sudden, large pressure differentials in the hydraulic system. A slow leak does not elicit a response, and a vehicle parked overnight may lose the hydraulic fluid from all suspension cylinders through a minor leak in one cylinder, resulting in shifting of the cargo and toppling of the vehicle.

It is the primary object of this invention to provide a safety system which automatically takes remedial action not only in the event of a sudden, major loss of hydraulic fluid from a system of load-distributing cylinders, but also responds to a gradual fluid loss due to slow leakage.

With this object, and others in view, the invention provides a suspension arrangement in which each suspension unit includes a cylinder member defining a first cavity, a plunger member movable inward and outward of the cavity, and fastening means for fastening the two members to the frame and to the associated axle of the vehicle as is conventional. The invention further provides a cylinder element defining a second cavity and secured to one of the afore-mentioned members for joint movement therewith, and a plunger element movable inward and outward of the second cavity and secured to the other one of the two members for joint movement.

A valve is interposed between a pressure conduit and each of the first cavities, and a control conduit communicates with each of the second cavities. Means are provided for sealing the pressure and control conduits from each other in all operative positions of the afore-mentioned members, elements, and valves. Respective valve actuating devices are associated with the several units and respond to a pre-set difference between the fluid pressures in the control conduit and in the associated first cavity for closing the valve interposed between the associated first cavity and the pressure conduit.

Figure 2:
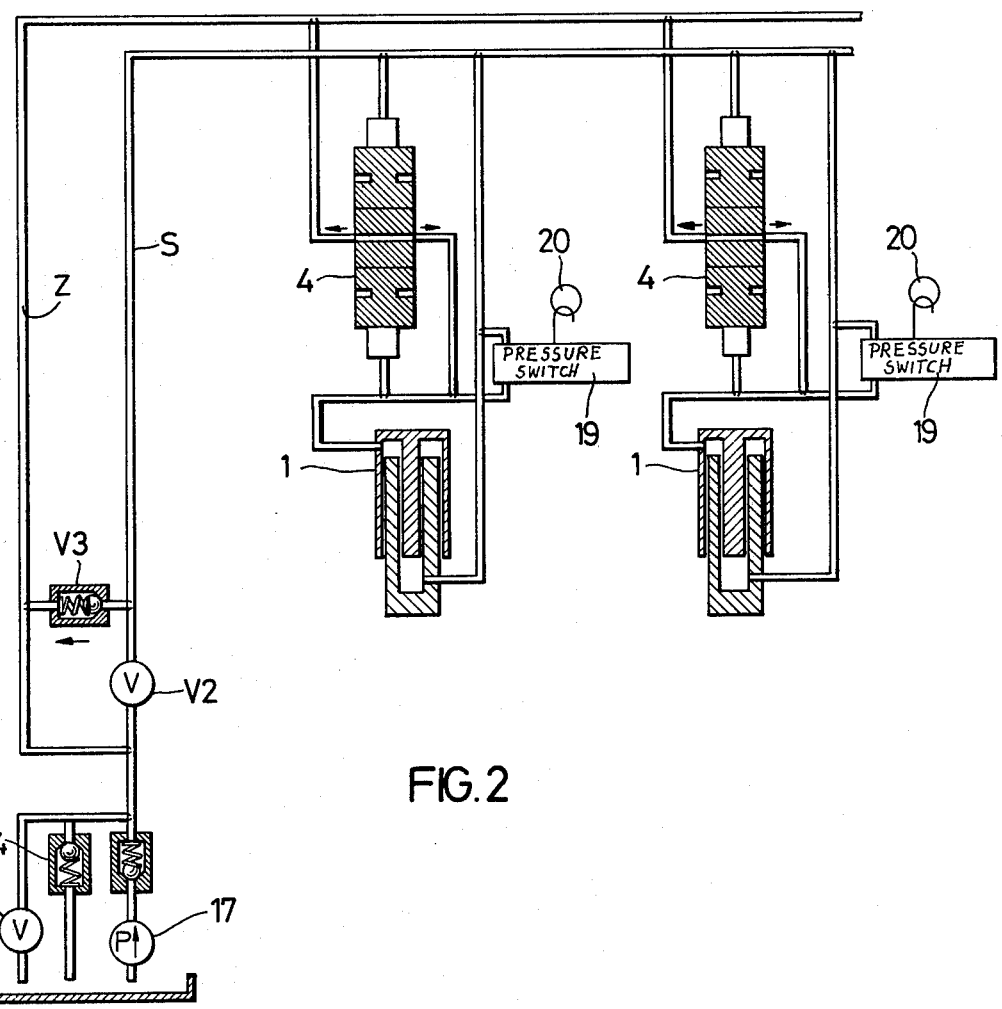

Other features, additional objects, and many of the attendant advantages of this invention will readily be appreciated as the same becomes better understood by reference to the following detailed description of a preferred embodiment when considered in connection with the appended drawing in which:

FIG. 1 shows a unit of a suspension arrangement of the invention in elevation, and partly in elevational section; and FIG. 2 diagrammatically illustrates the hydraulic circuit of a suspension arrangement including several units of the type shown in FIG. 1.

Referring initially to FIG. 1, there is shown a load-distributing, single-acting cylinder assembly 1 whose axial ends carry fastening eyes 2,2a normally attached to the frame and to an axle of a vehicle, not itself shown. The assembly 1 is illustrated in its axially collapsed or retracted condition.

The fastening eye 2 is mounted on a cylinder head 3 to which a control valve 4 is attached. The casing 4a of the valve 4 has an axial bore 5 which is of cylindrical shape except for two annular, enlarged sections axially offset in opposite directions from the center of the bore 5.

A slide or valve body 6 is movably received in the bore 5. It has a reduced, central stem portion which separates piston portions 7,8 of the valve body. The piston portions are dimensioned sealingly to engage the walls of the bore 5 except in the afore-mentioned annular sections. Helical compression springs 9,10 interposed between the piston portions 7,8 and the housing 4a bias the valve body 6 toward the illustrated equilibrium position in which they axially bound a central compartment in the bore 5 including both enlarged sections.

Terminal compartments of the bore 5 are axially bounded by the piston portions 7,8 and by respective plugs and communicate through radially open ports with bores S1 and Z2 in the cylinder head 3. Two additional ports respectively communicate with the two enlarged sections in the central compartment of the bore 5. One is provided with a nipple normally attached to a hydraulic pressure line Z, whereas the other communicates with a bore Z1 in the cylinder head 3. The plug adjacent the piston portion 8 is tubular and is normally connected to a hydraulic control line S.

A cylinder 11 is fixedly fastened to the head 3 and slidably receives a coaxial plunger 12. An axially terminal portion of the plunger which normally projects from the cylinder 11 carries the fastening eye 2a. The plunger 12 is guided in the oversized cavity of the cylinder 11 by a sleeve 13, and sealed to the cylinder wall by sealing rings 13a,13b adjacent the sleeve and other sealing elements. The aforementioned bore Z1 terminates in the cavity of the cylinder 11, and the much narrower bore Z2 branches from the bore Z1 in the cylinder head 3.

A central, axially elongated cavity 14 in the plunger 12 is upwardly open and downwardly closed. A tubular plunger 15 is fixedly attached to the cylinder head 3 and coaxially received in the cavity 14 with radial clearance. The bore of the plunger 15 is connected with the bore S1 in the cylinder head 3. The plunger 15 is guided in the bore 14 by a ring 16 partly recessed in the plunger 12 and provided with a sealing ring 16a which seals the cavity 14 from the cavity of the cylinder 11.

The manner in which several units identical with the one shown in FIG. 1 are connected with each other and with other elements of the hydraulic suspension circuit is shown in FIG. 2. Only two of the several cylinder assemblies 1 and the associated valves 4 are shown in a simplified manner in FIG. 2, additional units being identical with those illustrated. The hydraulic fluid required for the suspension arrangement is drawn by a pump 17 from a sump 18 and driven under pressure into the line Z. A shutoff valve V1 and a safety valve V4 connect the line Z to the sump 18. The valve V1 permits the entire hydraulic system to be drained for repairs or maintenance, and the safety valve V4 limits the pressure in the hydraulic system to a safe, maximum value. The control line S branches from the pressure line Z through a shut-off valve V2. A check valve V3 by-passes the shut-off valve V2 and limits the pressure differential between the lines Z, S in the event of a pressure drop in the line Z.

In operating the illustrated apparatus, starting from the condition of all units illustrated in FIG. 1, the valve V1 is closed and the valve V2 is opened, and the pump 17 is energized. Oil flows into the cavity of each cylinder 11, hereinafter referred to as "first cavity," and into each cavity 14, hereinafter referred to as "second cavity" until the non-illustrated vehicle frame is raised to a desired level. The pump 17 is then stopped, and the valve V2 is closed, thereby sealing the control line S from the pressure line Z while the hydraulic pressures in both lines and in all first and second cavities are equal, and all valve slides 6 are in the position shown in FIG. 1.

During travel of the vehicles over an uneven road, an axle may receive a transient dynamic load, causing the associated plunger 12 to move inward of its cylinder 11 and the hydraulic fluid to be transferred temporarily to the other axles through the open valves 4. The springs 9,10 prevent closing of the valves under the momentary unequal pressure increases in the first and second cavities.

In the event of sudden, heavy fluid loss from one cylinder 11, the plunger 12 moves toward the illustrated position, but the pressure in the first cavity drops, while the pressure in the associated second cavity increases because of frictional drag in the lines connecting the cavities with the associated lines S, Z. The valve slide 6 is moved downward, as viewed in FIG. 1, until the piston portion 7 seals the orifice of the bore Z2 or the spring 9 is fully compressed. In this position of the slide 6, the piston portion 8 engages the wall of the bore 5 between the two enlarged sections, seals the leaking cylinder 11 from the pressure line Z, and prevents drain of fluid from the other elements of the hydraulic system communicating with the line Z. A nonillustrated limit switch in the valve 4 or a pressure-responsive switch 19, shown only in FIG. 2 to be arranged between the first and second cavities energizes a signal lamp 20 arranged on the dashboard of the vehicle in a conventional manner, not shown, to warn the driver.

If a minor leak develops anywhere in the pressure line Z or in any conduit communicating with the line, all valves 4 are closed before the associated first cavities are completely drained because of increasing pressure in the control line S and the associated second cavities, and all signal lamps light up. In the less likely event of pressure loss from the control line S and/or associated cavities, the valve slide 6 is shifted until the piston portion 7 seals the first cavity from the pressure line Z and the pressure switch 19 energizes an alarm signal which may be the same lamp 20 that indicates a defect in the main hydraulic system or a different lamp.

The illustrated arrangement in which an integral portion of the plunger member 12 constitutes the cylinder element of the associated control device is preferred because of its simplicity and effectiveness, but the piston or plunger member of the main hydraulic device may be connected to the cylinder element of the control device for joint movement in any other desired manner if the cylinder member of the main hydraulic device is connected for joint movement with the piston or plunger element of the control device, the terms piston and plunger being interchangeable for the purpose of this invention.

High pressure differentials for operating the valve 4 are produced if the volumes of the first and second cavities simultaneously decrease and increase during the joint relative movements of cylinders and plungers, and if the cross sections of the second cavity and of the associated plunger are smaller than the cross-section of the first cavity and of the control plunger, but different arrangements are operative with valves 4 of suitably modified sensitivity to pressure differences. If the plunger or piston member bounding the first cavity is not an integral part of an element of the control device, it is readily possible to link the two devices of each unit by connecting the two cylinders to each other and similarly to connect the two plungers or cylinders. They may be linked in such a manner that any accidental pressure drop in the first cavity causes a greater pressure drop in the associated second cavity so that a valve responsive to the pressure difference shuts off the main hydraulic device.

Other modifications of the illustrated apparatus will readily suggest themselves to those skilled in the art. It should be understood, therefore, that the foregoing disclosure relates only to a preferred embodiment of the invention, and that it is intended to cover all changes and variations in the example of the invention herein chosen for the purpose of the disclosure which do not constitute departures from the spirit and scope of the invention set forth in the appended claims.

What is claimed is:

1. A suspension arrangement for a vehicle having a plurality of axles and a frame supported by said axles comprising:
    a. a plurality of suspension units respectively associated with said axles, each unit including
        1. a cylinder member defining a first cavity,
        2. a plunger member movable inward and outward of said cavity,
        3. fastening means for fastening said members to said frame and to the associated axle respectively,
        4. a cylinder element defining a second cavity and secured to one of said members for joint movement therewith, and
        5. a plunger element moveable inward and outward of said second cavity and secured to the other one of said members for joint movement with the other member;
    b. a pressure conduit;
    c. a valve interposed between said conduit and said first cavity of each suspension unit;
    d. a control conduit communicating with said second cavity of each suspension unit;
    e. means for sealing said conduits from each other in all operative positions of said members, said elements, and said valves; and
    f. a plurality of valve actuating means respectively associated with said units and responsive to a predetermined difference between respective fluid pressures in said control conduit and in the associated first cavity for closing the valve interposed between said associated first cavity and said pressure conduit.

2. An arrangement as set forth in claim 1, wherein said cylinder member is fixedly fastened to said plunger element, and said plunger member is integral with said cylinder element.

3. An arrangement as set forth in claim 1, further comprising a source of hydraulic fluid under pressure communicating with one of said conduits, said sealing means including a valve movable between a sealing position and a connecting position, said valve connecting the other conduit to said source when in said connecting position.

4. An arrangement as set forth in claim 1, wherein each of said valves includes a valve housing and a valve body movable in said housing between two positions and separating three compartments offset in said housing in the direction of movement of said valve body, said control conduit and the associated first cavity being connected to two of said compartments, said valve housing having two ports respectively connected to said pressure conduit and to said associated first cavity, the third compartment communicating with said two ports in one of said positions of said valve body, said valve body sealing said ports from each other in the other position.

5. An arrangement as set forth in claim 4, further comprising yieldably resilient means biasing said valve body toward said one position.

* * * * *